US012530077B2

United States Patent
Zhang et al.

(10) Patent No.: US 12,530,077 B2
(45) Date of Patent: Jan. 20, 2026

(54) RETINAL REFLECTION TRACKING FOR GAZE ALIGNMENT

(71) Applicant: Apple Inc., Cupertino, CA (US)

(72) Inventors: Arthur Y. Zhang, San Jose, CA (US); Tong Chen, Fremont, CA (US); Siddharth S. Hazra, Hayward, CA (US); Nicholas C. Soldner, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/138,233

(22) Filed: Apr. 24, 2023

(65) Prior Publication Data

US 2023/0359273 A1     Nov. 9, 2023

Related U.S. Application Data

(60) Provisional application No. 63/338,233, filed on May 4, 2022.

(51) Int. Cl.
    *G06F 3/01*          (2006.01)
    *G02B 27/01*       (2006.01)

(52) U.S. Cl.
    CPC ........... *G06F 3/013* (2013.01); *G02B 27/017* (2013.01)

(58) Field of Classification Search
    CPC ................ G06F 3/013; G02B 27/017; G02B 2027/0138; G02B 27/0093; G06V 40/18
    See application file for complete search history.

(56) References Cited

U.S. PATENT DOCUMENTS

| | | | | |
|---|---|---|---|---|
| 5,978,015 A | * | 11/1999 | Ishibashi | H04N 13/373 |
| | | | | 348/E13.052 |
| 10,962,789 B1 | * | 3/2021 | Lewis | A61B 3/113 |
| 2015/0126281 A1 | * | 5/2015 | Lewis | A63F 13/213 |
| | | | | 351/158 |

(Continued)

FOREIGN PATENT DOCUMENTS

| | | | | | |
|---|---|---|---|---|---|
| WO | WO-2022133048 A1 | * | 6/2022 | ......... | G02B 27/0093 |
| WO | WO-2022159630 A1 | * | 7/2022 | ......... | G02B 27/0172 |

OTHER PUBLICATIONS

Katrychuk, Dmytro, Griffith, Henry K. and Komogortsev, Oleg V.; "Power-efficient and shift-robust eye-tracking sensor for portable VR headsets"; ETRA' 19, Jun. 25-28, 2019; pp. 1-8.

(Continued)

*Primary Examiner* — Sahlu Okebato
(74) *Attorney, Agent, or Firm* — Thompson Hine LLP

(57) ABSTRACT

Various implementations disclosed herein include devices, systems, and methods that initiate an action based on a detected gaze direction oriented towards a target area (e.g., a hot corner/zone). For example, an example process may include producing a reflection by directing light towards an eye using an illuminator, receiving sensor data from a sensor, wherein a direction of sensing by the sensor (e.g., the optical axis of the camera) and a direction from the eye to a target area are approximately aligned, determining a reflective property (e.g., a spectral property) of the reflection based on the sensor data, detecting that a gaze direction of the eye is approximately oriented towards the target area (e.g., a hot zone/spot) based on the reflective property, and initiating an action based on detecting that the gaze direction is approximately oriented towards the target area.

24 Claims, 10 Drawing Sheets

(56) References Cited

U.S. PATENT DOCUMENTS

| | | |
|---|---|---|
| 2015/0309568 A1 | 10/2015 | Miki |
| 2016/0081547 A1* | 3/2016 | Gramatikov ........... G01N 21/23 356/369 |
| 2018/0164880 A1 | 6/2018 | Kim et al. |
| 2018/0278924 A1 | 9/2018 | Schowengerdt et al. |
| 2020/0257113 A1 | 8/2020 | Bednarik et al. |
| 2021/0088784 A1 | 3/2021 | Whitmire et al. |
| 2021/0088790 A1* | 3/2021 | Forster ............... G02B 27/0176 |
| 2021/0157401 A1 | 5/2021 | Abele et al. |
| 2021/0173474 A1* | 6/2021 | Sztuk ................... G06T 19/006 |
| 2021/0378509 A1 | 12/2021 | Nistico |
| 2021/0386289 A1* | 12/2021 | Aschwanden ......... H04N 23/55 |

OTHER PUBLICATIONS

Rigas, Ioannis, Raffle, Hayes and Komogortsev, Oleg V.; "Hybrid PS-V Technique: A Novel Sensor Fusion Approach for Fast Mobile Eye-Tracking With Sensor-Shift Aware Correction"; IEEE Sensors Journal, vol. 17, No. 24, Dec. 15, 2017, pp. 8356-8366.

Kraats van de, Jan and Norren van, Dirk; "Directional and nondirectional spectral reflection from the human fovea"; Journal of Biomedical Optics 13(2), 024010 (Mar./Apr. 2008); pp. 024010-1-024010-13.

European Patent Office, International Search Report and Written Opinion of the International Searching Authority, International Application No. PCT/US2023/019182, 12 pages, Jul. 13, 2023.

* cited by examiner

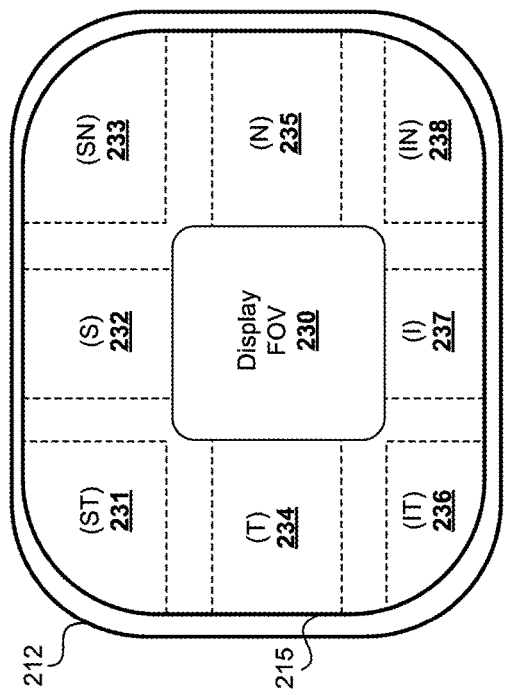
FIG. 2B
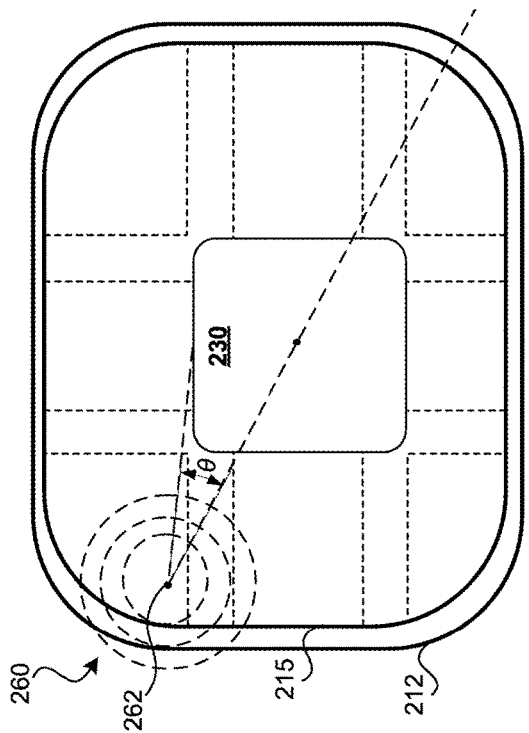
FIG. 2C
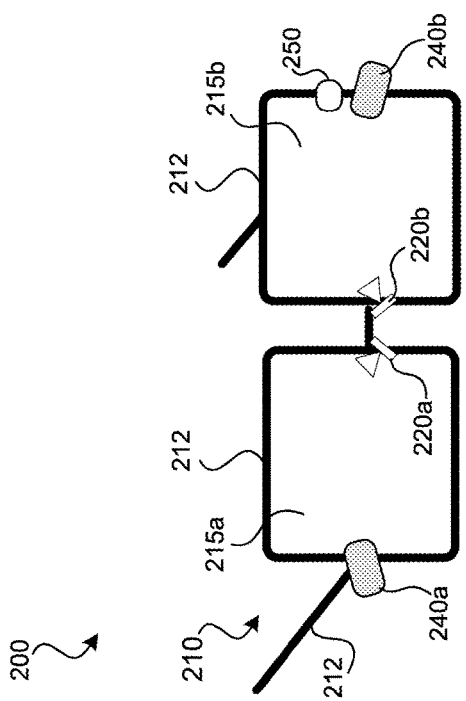
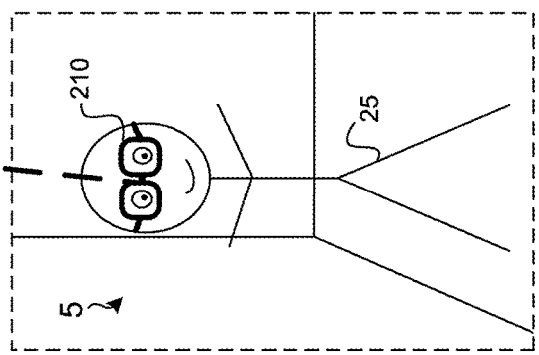
FIG. 2A

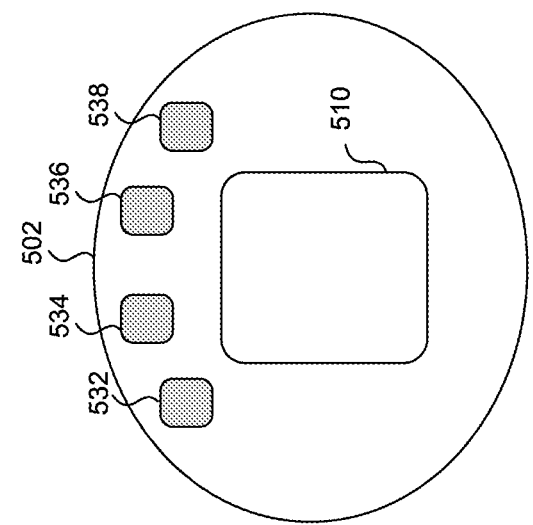
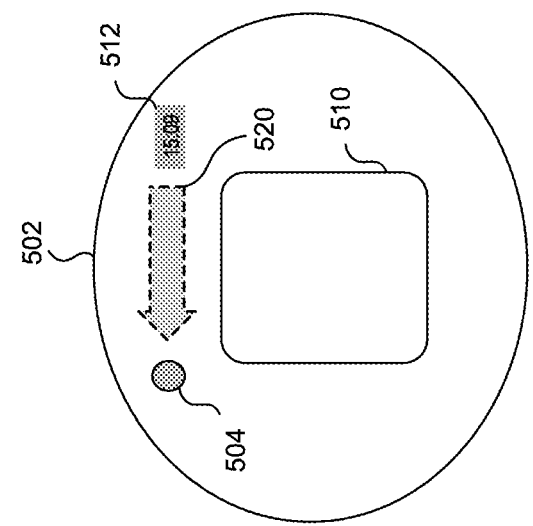
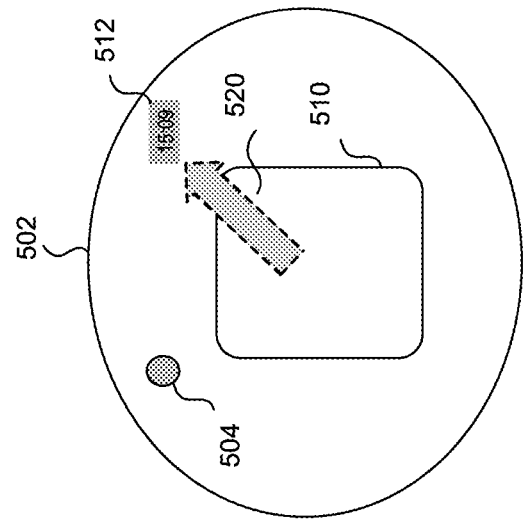

RETINAL REFLECTION TRACKING FOR GAZE ALIGNMENT

CROSS-REFERENCE TO RELATED APPLICATIONS

This application claims the benefit of U.S. Provisional Application Ser. No. 63/338,233 filed May 4, 2022, which is incorporated herein in its entirety.

TECHNICAL FIELD

The present disclosure generally relates to electronic devices, and in particular, to systems, methods, and devices for detecting an eye gaze direction of users of electronic devices.

BACKGROUND

Existing eye-tracking techniques analyze glints that are reflected off of a user's eye and captured via an image sensor. Some head mounted systems may include eye-tracking techniques using near-infrared (nIR) illuminators and standard multi-pixel complementary metal oxide semiconductor (CMOS) cameras pointed at each eye. The combination of nIR illuminators and CMOS cameras may provide accurate and high frame rate (e.g., greater than 15 frames per second) tracking of each eye. However, this typical nIR+CMOS configuration has a baseline power which doesn't scale well as frame rate is reduced and is not feasible in very low power applications to keep the CMOS imager and nIR LEDs on all the time. Thus, it may be desirable to provide a means of efficiently providing an eye tracking system that does not need to be continually tracked across the entire possible gaze space in order to provide power savings for assessing an eye characteristic (e.g., gaze direction, eye orientation, identifying an iris of the eye, etc.) for head mountable systems.

SUMMARY

Various implementations disclosed herein include devices, systems, and methods that initiating an action based on detecting that an eye gaze direction of a user is approximately oriented towards a target area (e.g., a hot zone/corner). Determining that an eye is gazing at a target area (e.g., a hot zone/corner) is based on detecting that a reflection of light off of an eye has certain properties, e.g., a spectral property indicative of a redeye-type reflection that is aligned approximately towards the target area. An illuminator and/or detector may be optically aligned with an approximate direction from the eye to the target area, e.g., by positioning the illuminator/detector in and/or behind the target area of the display/lens or using an optical waveguide in the target area of the lens. The detector may be a near infrared (nIR) transceiver sensitive to spectral reflections at narrow co-axial angles. The detector may use low-power hardware (e.g., a photodiode paired with a lens) that can be active when a high-power eye tracking hardware (e.g., a multi-pixel complementary metal oxide semiconductor (CMOS)) is off. For example, a user may glance at a hot corner to trigger an action, e.g., initiate an extended reality (XR) experience that uses full eye tracking, provide a response to a notification, and the like. The intended action may be initiated if the gaze satisfies a criterion, e.g., a glance lasting more than a threshold amount of time.

In general, one innovative aspect of the subject matter described in this specification can be embodied in methods that include the actions of, at an electronic device having a processor and a display, producing a reflection by directing light towards an eye using an illuminator, receiving sensor data from a sensor, wherein a direction of sensing by the sensor and a direction from the eye to a target area are approximately aligned, determining a reflective property of the reflection based on the sensor data, detecting that a gaze direction of the eye is approximately oriented towards the target area based on the reflective property, and initiating an action based on detecting that the gaze direction is approximately oriented towards the target area.

These and other embodiments can each optionally include one or more of the following features.

In some aspects, the reflective property is indicative of an amount of reflection of the light from a fundus of the eye. In some aspects, an amount of the reflection is indicative of a level of alignment between the direction of sensing of the sensor and the gaze direction.

In some aspects, detecting that the gaze direction of the eye is approximately oriented towards the target area includes determining that the reflective property is within an angular threshold, wherein the angular threshold indicates that the gaze direction is within a threshold of a target direction.

In some aspects, detecting that the gaze direction of the eye is approximately oriented towards the target area includes generating, based on the reflection, a time-amplitude response to identify that the gaze direction is aligned approximately towards the target area.

In some aspects, detecting that the gaze direction of the eye is approximately oriented towards the target area includes generating, based on the reflection, a frequency-time response to identify when the gaze direction is aligned approximately towards the target area.

In some aspects, detecting that the gaze direction of the eye is approximately oriented towards the target area is based on using a parameterized model of the eye.

In some aspects, the sensor is a first sensor, and the action triggers an eye tracking algorithm based on sensor data received from a second sensor, wherein the first sensor is different than and uses lower power than the second sensor.

In some aspects, the action is initiated based on whether the gaze direction satisfies a criterion. In some aspects, the action provides a user response to a notification.

In some aspects, the action includes initiating an extended reality (XR) experience.

In some aspects, the target area is positioned at one zone of a plurality of zones on a display of the electronic device.

In some aspects, the sensor is a photodiode. In some aspects, the light is infrared (IR) light.

In some aspects, the method further includes detecting gaze directions towards multiple target areas using multiple illuminators and multiple sensors corresponding to the multiple target areas, wherein the multiple illuminators produce light having different wavelengths, wherein the multiple sensors distinguish reflections of light produced by the multiple illuminators based on wavelength.

In some aspects, the electronic device is a head-mounted device (HMD). In some aspects, the HMD includes a waveguide, wherein the waveguide approximately aligns the direction of sensing by the sensor, or the direction of the light produced by the illuminator with the direction from the eye to the target area.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2A illustrates an example head mounted display (HMD) in accordance with some implementations.

FIG. 2B illustrates zones of a transparent substrate of the HMD of FIG. 2A in accordance with some implementations.

FIG. 2C illustrates an example hot corner detection in a zone of the HMD of FIG. 2A in accordance with some implementations.

FIGS. 5A-5C illustrate an example user experience for detecting an eye gaze direction in accordance with some implementations.

Figure 1:
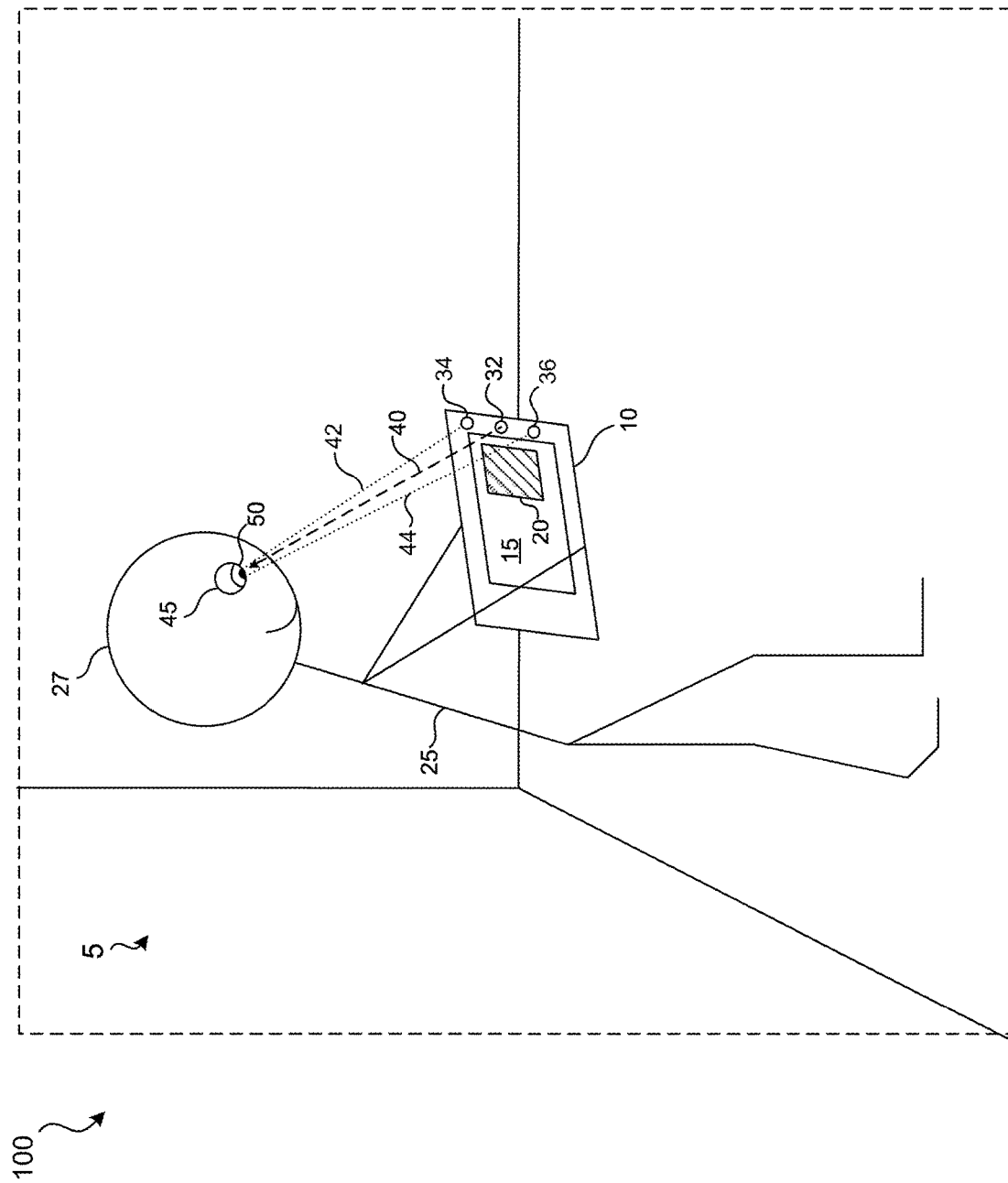
FIG. 1 illustrates a device displaying content and obtaining physiological data from a user according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example environment 100 of a real-world environment 5 (e.g., a room) including a device 10 with a display 15. In some implementations, the device 10 displays content 20 to a user 25. For example, content 20 may be a button, a user interface icon, a text box, a graphic, an avatar of the user or another user, etc. In some implementations, the content 20 can occupy the entire display area of display 15.

The device 10 obtains image data, motion data, and/or physiological data (e.g., pupillary data, facial feature data, etc.) from the user 25 via one or more sensors (e.g., sensor 34, sensor 36). For example, the device 10 includes a light source 32 (e.g., a light-emitting diode (LED) that may be used to illuminate specular and diffusive parts of the eye 45 of the user 25 via light rays 40 (e.g., infrared (IR) light). Based on the specular illumination of the eye 45, the device 10 may obtain eye gaze characteristic data 42 via a high-power sensor 34, such as a complementary metal oxide semiconductor (CMOS). Additionally, or alternatively, the device 10 may obtain eye gaze characteristic data 44 via a low-power sensor 36, such as a photodiode.

While this example and other examples discussed herein illustrate a single device 10 in a real-world environment 5, the techniques disclosed herein are applicable to multiple devices as well as to other real-world environments. For example, the functions of device 10 may be performed by multiple devices, with a high-power sensor 34, a low-power sensor 36, and a light source 32 on each respective device, or divided among them in any combination.

In some implementations, as illustrated in FIG. 1, the device 10 is a handheld electronic device (e.g., a smartphone or a tablet). In some implementations the device 10 is a laptop computer or a desktop computer. In some implementations, the device 10 has a touchpad and, in some implementations, the device 10 has a touch-sensitive display (also known as a "touch screen" or "touch screen display"). In some implementations, the device 10 is a wearable device such as a head-mounted device (HMD).

In some implementations, the device 10 includes an eye-tracking system for detecting eye position and eye movements via eye gaze characteristic data 42, 44. For example, an eye-tracking system may include one or more IR LEDs (e.g., light source 32), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye-tracking system may be analyzed to detect position and movements of the eyes of the user 25, or to detect other information about the eyes such as color, shape, state (e.g., wide open, squinting, etc.), pupil dilation, or pupil diameter. Moreover, the point of gaze estimated from the eye tracking images may enable gaze-based interaction with content shown on the near-eye display of the device 10.

In some implementations, the device 10 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, one or both eyes 45 of the user 25, including one or both pupils 50 of the user 25 present physiological data in the form of a pupillary response (e.g., eye gaze characteristic data 42, 44) detected from a glint analysis. The pupillary response of the user 25 may result in a varying of the size or diameter of the pupil 50, via the optic and oculomotor cranial nerve. For example, the pupillary response may include a constriction response (miosis), e.g., a narrowing of the pupil, or a dilation response (mydriasis), e.g., a widening of the pupil. In some implementations, the device 10 may detect patterns of physiological data representing a time-varying pupil diameter.

FIG. 2A illustrates an example operating environment 200 that includes the real-world environment 5 (e.g., a room from FIG. 1) including a user 25 wearing device 210, an HMD. In this example, the device 210 is an HMD that includes a transparent or a translucent display that includes a medium through which light representative of images is directed to the eyes of user 25. In particular, device 210 is an HMD that may also be referred to herein as "AR glasses" or "XR glasses." Such XR glasses may include a transparent display to view the physical environment and be provided a display to view other content via retinal projection technology that projects graphical images within a view of a person's retina or onto a person's retina.

As illustrated, device 210 includes a frame 212 that can be worn on the user's head and may include additional extensions (e.g., arms) that are placed over ears of the user 25 to hold the frame in place on the user's head. The device 210 includes two displays for a left eye and a right eye of the user 25. The frame 212 supports a first lens 215a, and a second lens 215b. Each lens 215 includes a transparent substrate. Each lens 215 may be configured as a stack that includes a bias (+/−) for prescription lenses, a waveguide for housing or embedding a plurality of IR light sources and transparent conductors, and the like. The device 210 further includes detector 220a, 220b, for each lens 215a, 215b, respectively. A detector 220 may be an image sensor, such as an IR camera, that detects reflected light rays from an eye of the user, such as a glint.

In some implementations, the device 210 further includes projector 240a, 240b, for each lens 215a, 215b, respectively. A projector 240 may be used to display XR content to the user (e.g., virtual content that appears to the user at some focal point distance away from the device 210 based on the configuration of the lens). A waveguide stacked within the lens 215 may be configured to bend and/or combine light that is directed toward the eye of the user 25 to provide the appearance of virtual content within the real physical environment 5. In some implementations, the device 210 may only include one projector 240. For example, a pair of XR glasses for a user that only displays XR content on one side of the device 210 so the user 25 is less distracted and can have a greater view of the physical environment 5.

In some implementations, the device 210 further includes a controller 250. For example, the controller 250 may include a processor and a power source that controls the light being emitted from light sources. In some implementations, the controller 250 is a microcontroller that can control the processes described herein for assessing characteristics of the eye (e.g., gaze direction, eye orientation, identifying an iris of the eye) based on the sensor data obtained from the detector 220. Alternatively, the controller 250 may be communicatively coupled (e.g., wireless communication) with another device, such as a mobile phone, tablet, and the like, and the controller 250 may send data collected from the detector 220 to be analyzed by the other device. In the exemplary implementation, the device 210 (with the controller 250) is a stand-alone unit that can project the virtual content via projector 240 and assess characteristics of the eye via light sources for eye tracking purposes without communicating with another device.

FIG. 2B illustrates zones of a transparent substrate (e.g., lens 215) of an HMD (e.g., device 210 of FIG. 2A) in accordance with some implementations. In particular, FIG. 2B illustrates an example of eight defined "hot corner zones" that the processes described herein may use for hot spot detection areas (e.g., zones/areas around the display FOV 230). The example zones include the Superior Temporal (ST) zone 231, the Superior (S) zone 232, the Superior Nasal (SN) zone 233, the Temporal zone 234, the Nasal zone 235, the Inferior Temporal zone 236, the Inferior zone 237, and the Inferior Nasal zone 238. However, more or less zones may be defined for each lens 215 of the device 210.

In some implementations, each hot spot zone may include a zone tolerance. For example, each zone border may allow a 10° tolerance margin to account for sensor placement, occlusion, extreme angle constraints, and the like. In some implementations, the hot corner update rate may be determined for each hot corner zone determined by trigger-to-photon latency for the particular lens 215 of the device 210. For example, it may be desired to have a trigger-to-photon latency of less than 100 ms. In some implementations, detection of a hot zone trigger may need more than one frame to detect if the hot corner is triggered based on a trigger threshold (e.g., at least three frames to generate a hot zone trigger).

FIG. 2C illustrates an example of a hot corner detection in a zone of an HMD (e.g., device 210 of FIG. 2A) in accordance with some implementations. In particular, FIG. 2C illustrates an eye gaze location at target area 262 of a user in the ST zone 231 of the lens 215 of the device 210, as illustrated by the hot zone area 260. In an exemplary implementation, the hot-corners may be implemented using arrays of ultrasonic sensors, photo-sensitive detectors, or electro-oculography sensors distributed around the rim of the frame 212 of the device 210. The eye postures and gestures that may be utilized by this subsystem may be defined by fixations, saccades, or a combination thereof. Thus, the sensors of the device 210 (e.g., detector 220) are able to provide an estimate of eye gaze velocity and gaze angles (e.g., angle θ).

The spatial regions corresponding to the hot corners are defined with respect to the display FOV 230 and the relative location of the eye as illustrated in FIGS. 2B and 2C. The hot corner zones may extend outwards from the corners and edges of the display FOV 230, up to and limited by the frame 212. In some implementations, instead of providing a direct gaze angle (e.g., angle θ), a binary output corresponding to whether a gaze is in one of those regions (e.g., ST zone 231) may be provided. Additionally, instead of providing a direct gaze velocity, an estimate of time the gaze is in one of those regions may be provided.

In some implementations, since edges of hot corners are defined with respect to the display FOV 230, and the display FOV 230 is defined by position of an eye inside an "eyebox", it may be required that a user undergoes an enrollment process after wearing the device 210. However, in an exemplary embodiment, a seamless and automatic enrollment may occur as the camera-based gaze tracking localizes left and right eye pupils of the user 25 automatically upon donning and during normal use of the device 210 (e.g. while the user 25 is wearing the device 210, such as an HMD). Then, periodically (e.g., once every minute), the camera-based gaze/pupil tracking system can wake, or may be triggered to wake, to verify whether the calibration is within a particular calibration threshold. Alternatively, in some embodiments the user may need to be instructed to focus at a particular target. For example, the user 25 may be instructed to focus his or her gaze to a particular location that is off in the distance of the display (e.g., focus at a location with that is 1.5 m away). For example, the particular location may be on the display of the device 10. If the user 25 is wearing the device 10 on his or her head (e.g., an HMD, such as device 210), than the location may appear on the display at a very far away distance (e.g., stare off into a small point such that the gaze may be looking out into infinity). The light waves from the light source are then reflected off of the retina of the eye 45 and detected by a detector to acquire image data of the retinal surface. The lens of the image sensor may be focused to infinity such that when combined with the eye's optics the retinal surface is sharply imaged onto the image sensor (e.g., when the eye is focused to infinity, which is the default for relaxed, healthy eye).

In some implementations, due to the binocular nature of gaze and variable ocular dominance (dominant eye behavior), each eye may be provided with an independent hot corner subsystem (e.g., an illuminator and detector 220 for each lens 215). For example, the user may initiate saccades outside of the normal gaze angles (~+/−) 20° that may lead to imperfect vergence behaviors where both eyes may not appear to fixate in the same region. Thus, a binocular hot corner subsystem may be used to compensate for such imperfect vergence behaviors.

In some implementations, the focal width for hot corner detection can be determined to distinguish between vestibulo-ocular reflex (VOR) fixations, visual search saccades, overshoot and refixations (such as those while reading text in the real world), and other non-hot corner triggers by pooling information from a pose subsystem and/or an application subsystem. Additionally, dwell and/or fixation times of a user's eye gaze may be important based on the applied application. Additionally, the hot corner detection techniques may also aid blink detection for the eye tracking system.

Figure 3A:
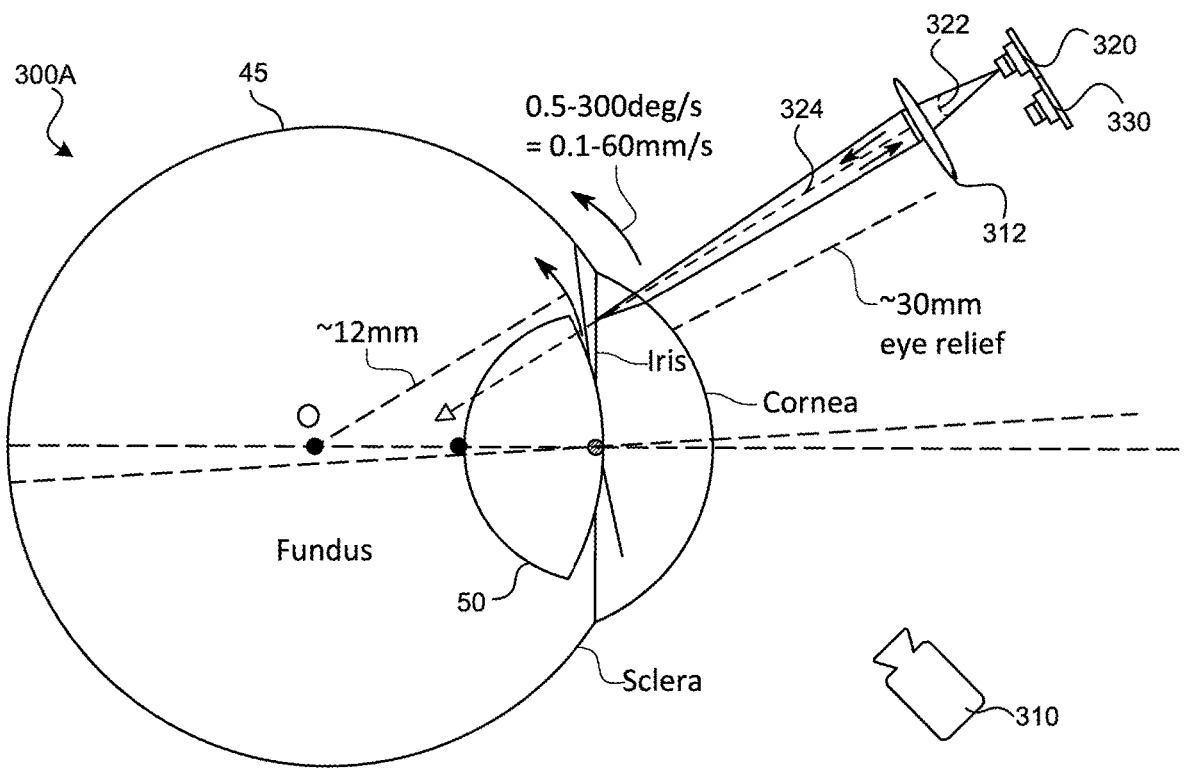
FIGS. 3A and 3B illustrate an example eye-tracking system in accordance with some implementations.
Figure 3B:
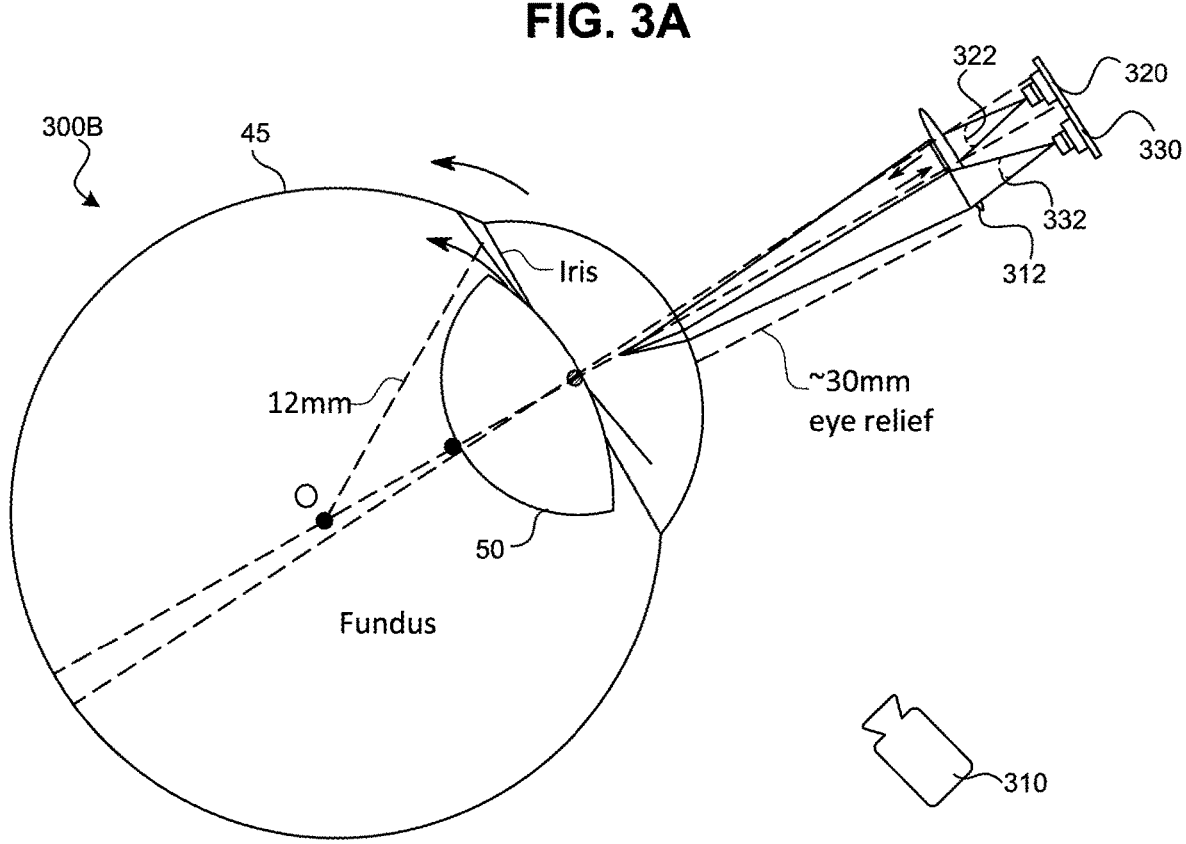

FIGS. 3A and 3B illustrate example environments 300A and 300B, respectively, of a hot-corner eye-tracking system in accordance with some implementations. The hot-corner eye-tracking system of example environments 300A and 300B uses a light source 320 such as a near-infrared (nIR) illuminator that produces IR light 324 (e.g., light source 32 on device 10) at an emission angle 322, and a light sensor 330 (e.g., low-power sensor 36 on device 10, such as a photodiode). FIG. 3A illustrates an example off-axis response where a user is accommodating his or her sight (e.g., the axis of fundus) directly straight forward (e.g., towards the middle of the display FOV 230 of FIG. 2C). FIG. 3B illustrates an example on-axis response (e.g., axis of fundus towards a hot-corner), where a user is accommodating his or her sight upwards in the superior area (e.g., above the display FOV 230 and in the S zone 232 of FIG. 2B).

In some implementations, as illustrated in FIGS. 3A and 3B, the light source 320 (e.g., an nIR illuminator such as and LED or the like), illuminates a surface of the retina of the eye 45 of the user as the user is accommodating his or her sight. The IR light 324 produced by light source 320 is illuminated with an emission angle 322. The low power light sensor 330 (e.g., a 1-2 pixel receiver, such as a photodiode) then measures reflectance of light, which includes a time-amplitude-angle relationship, as the light is reflected off of a surface of the eye 45. In some implementations, the emission angle 322 can cover a large region of the eye 45 to allow for any shift in position of the glasses and for user variations of his or her eye 45. For example, the emission angle 322 may be controlled such that it is not too wide as to waste energy, but wide enough to cover all eyeball locations for a set of users.

For the off-axis response of FIG. 3A, the user is not looking at a hot-corner (e.g., the users viewing angle is beyond a viewing angle threshold from the hot-corner, such as greater than 5°), then the reflectance of light at the light sensor 330 (e.g., an output from the photodiode) is below a threshold value. For the on-axis response of FIG. 3B, as the user is looking towards a hot-corner, then the reflectance of light at the light sensor 330 (e.g., the output from the photodiode) increases as axis of the fundus of the eye 45 aligns with the sensor.

Additionally, the hot-corner eye-tracking system of FIGS. 3A and 3B includes an image sensor 310 (e.g., sensor 34 on device 10, such as a CMOS camera) to observe light scattered off of the retina of the eye 45 in order to acquire an image of the eye 45. Image sensor 310 is part of an eye gaze tracking camera, and can be turned off during always-on "hot corner", but periodically awakened to calibrate position and eye relief.

Figure 4A:
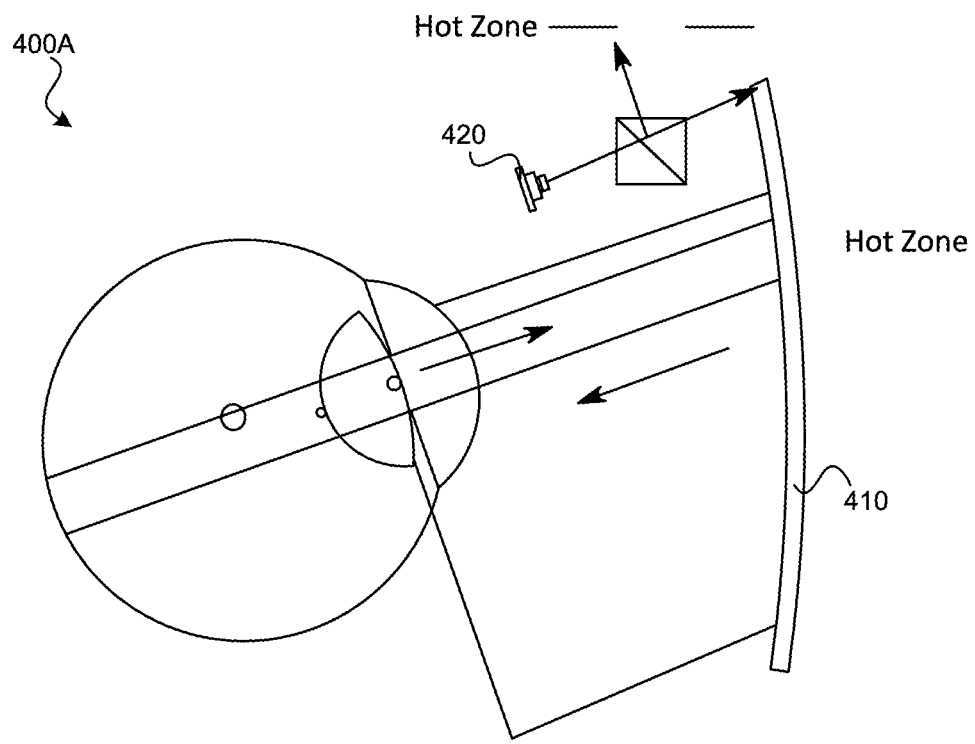
FIGS. 4A and 4B illustrate an optical effect for detecting an eye gaze direction towards a target area in accordance with some implementations.
Figure 4B:
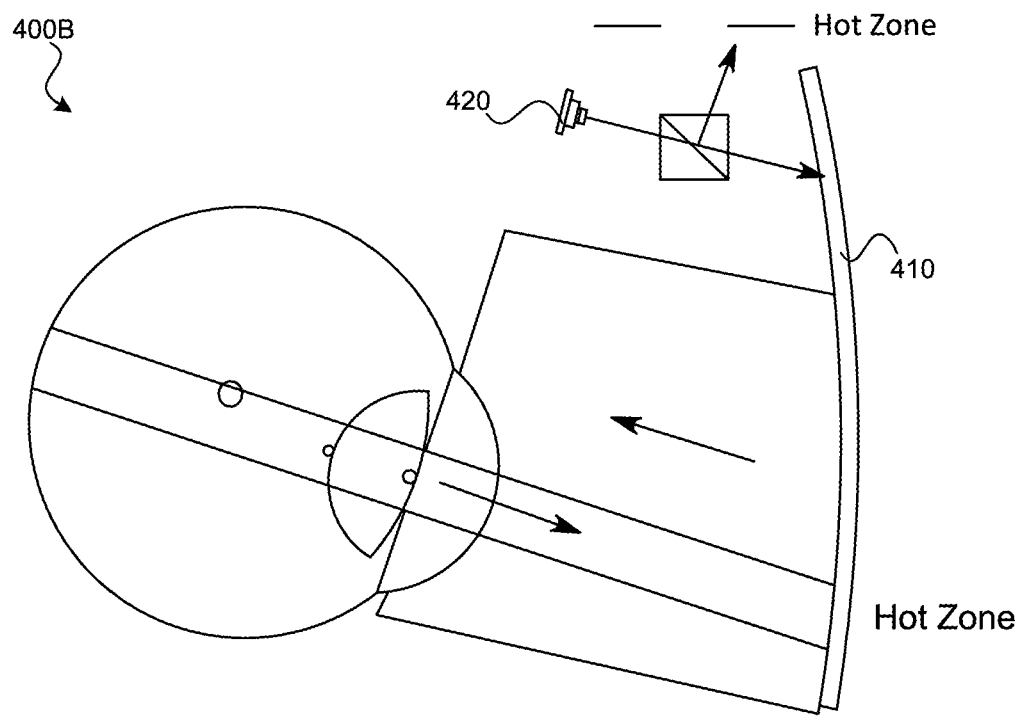

FIGS. 4A and 4B illustrate example environments 400A and 400B, respectively, of an optical effect for detecting an eye gaze direction towards a target area in accordance with some implementations. In particular, FIGS. 4A and 4B illustrate an example hot-corner eye tracking system utilizing a transparent substrate, such as an optical waveguide 410 that includes an integrated sensor 420 capable of measuring co-axial reflections from the human eye fundus. In some implementations, the sensor 420 may be a single sensor that covers multiple zones, as illustrated. Additionally, or alternatively, individual sensors (e.g., sensor 420) may be included for each zone. For example, a waveguide, such as waveguide 410) can be designed to support discrete locations (e.g., in 4 corners), without having to integrate an emitter/detector into the display optical engine of the waveguide. In some implementations, individual emitter/detectors can be integrated at different locations of the waveguide 410. Additionally, in some implementations, individual sensor modules can be integrated at each corner of the frames of device that includes the waveguide 410 (e.g., frame 212 of device 210). In some implementations, having individual sensor modules integrated at each corner of the frames of the eye-tracking device would not impact the display of the waveguide 410, but consumes space for the rim/frame.

FIGS. 5A-5C illustrate an example user experience for detecting an eye gaze direction through or on a lens 502 in accordance with some implementations. For example, FIGS. 5A-5C illustrate as user looking at or near a display of a device (e.g., device 10, 210, etc.) and initiating applications on a user interface based on his or her gaze towards a particular area (e.g., towards a hot corner). FIG. 5A illustrates a user looking to a particular area to initiate a clock application. For example, a user's gaze 520 is illustrated as looking towards the upper-right corner of the lens 502 outside of the FOV display 510 (e.g., a hot corner in the SN zone 233 of FIG. 2B). After a user's gaze 520 looks at the area in the upper-right corner within a threshold amount of time (e.g., within 500 ms of looking at the hot corner), the clock application 512 appears and another target application icon 504 appears in the upper-left corner. FIG. 5B illustrates a user moving his or her gaze 520 towards the application icon 504 in the upper-left corner. For example, the application icon 504 may be utilized as a confirmation location (e.g., an affirmation of the user wanting to initiate the clock application 512). In other words, to confirm that the user wanted to see a particular application. Alternatively, the application icon 504 could be utilized to turn off the clock application 512 (e.g., tell the user to look in the upper left corner whenever he or she wants to turn off or decline an application). FIG. 5C illustrates an alternative example. For example, FIG. 5C illustrates the display of application icons 532, 534, 536, 538, after the user has fixated his or her gaze 520 at application icon 504 for a threshold amount of time (e.g., greater than 500 ms). Thus, FIG. 5C illustrates an application of the hot-corner eye gaze detection systems described herein, that after a user has fixed his or her gaze towards a target area (e.g., a hot corner) for a threshold amount of time, then one or more user interface applications (e.g., application icons 532, 534, 536, 538) can be displayed to the user.

FIGS. 5A-5C illustrate an example user experience for detecting an eye gaze direction through or on a lens 502 as a user is looking at or near a display of a device (e.g., device 10, 210, etc.) and initiating applications on a user interface based on his or her gaze towards a particular area (e.g., towards a hot corner). Alternatively, in some implementations, nothing has to be displayed for this system to work, and the hot corner gesture to initiate an experience may be a learned behavior. For example, a user may be able to customize a particular location on the lens 502 for the hot corner to be displayed, such as in a particular zone.

Figure 6:
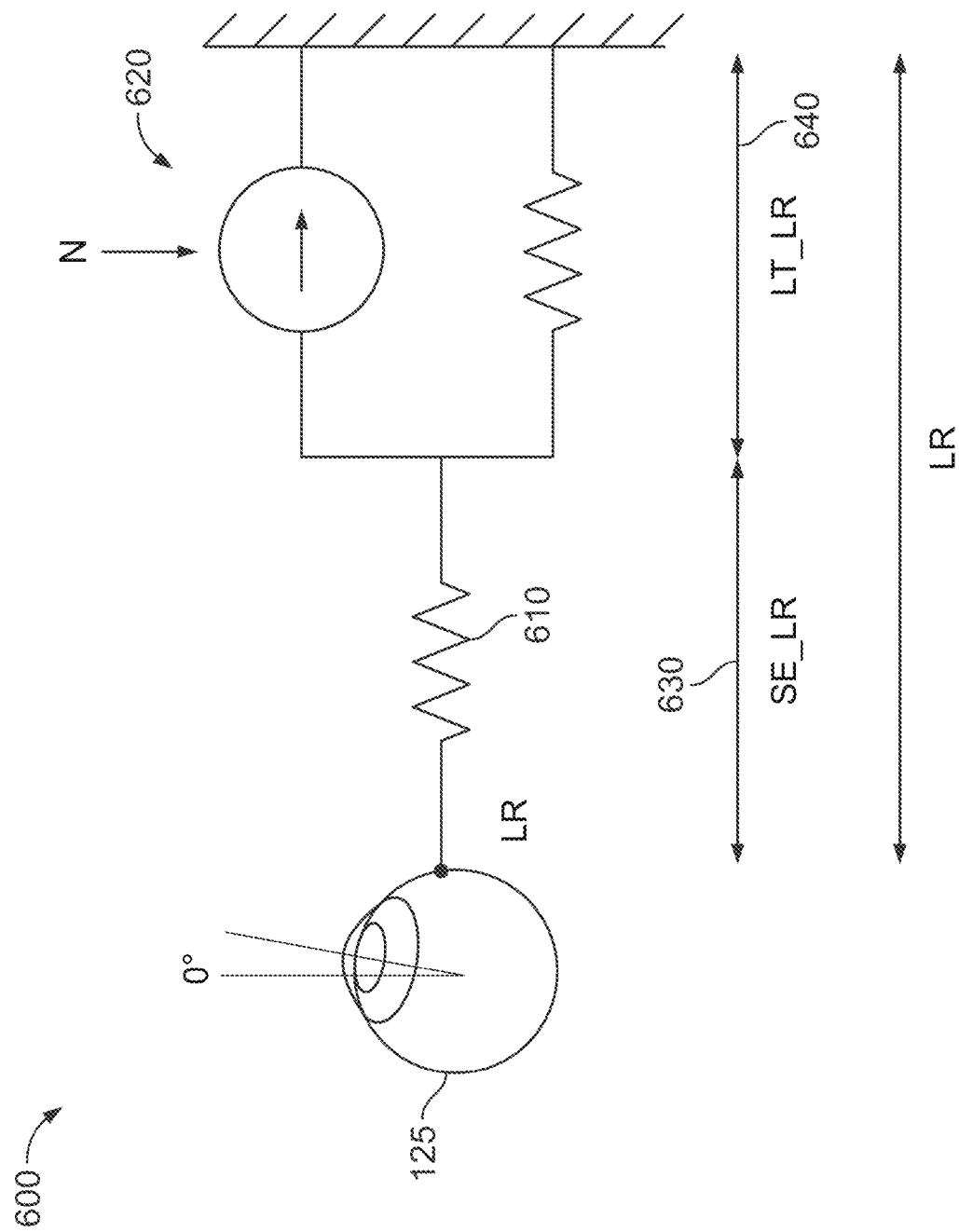
FIG. 6 illustrates a parameterized model of an eye in accordance with some implementations.
Figure 7:
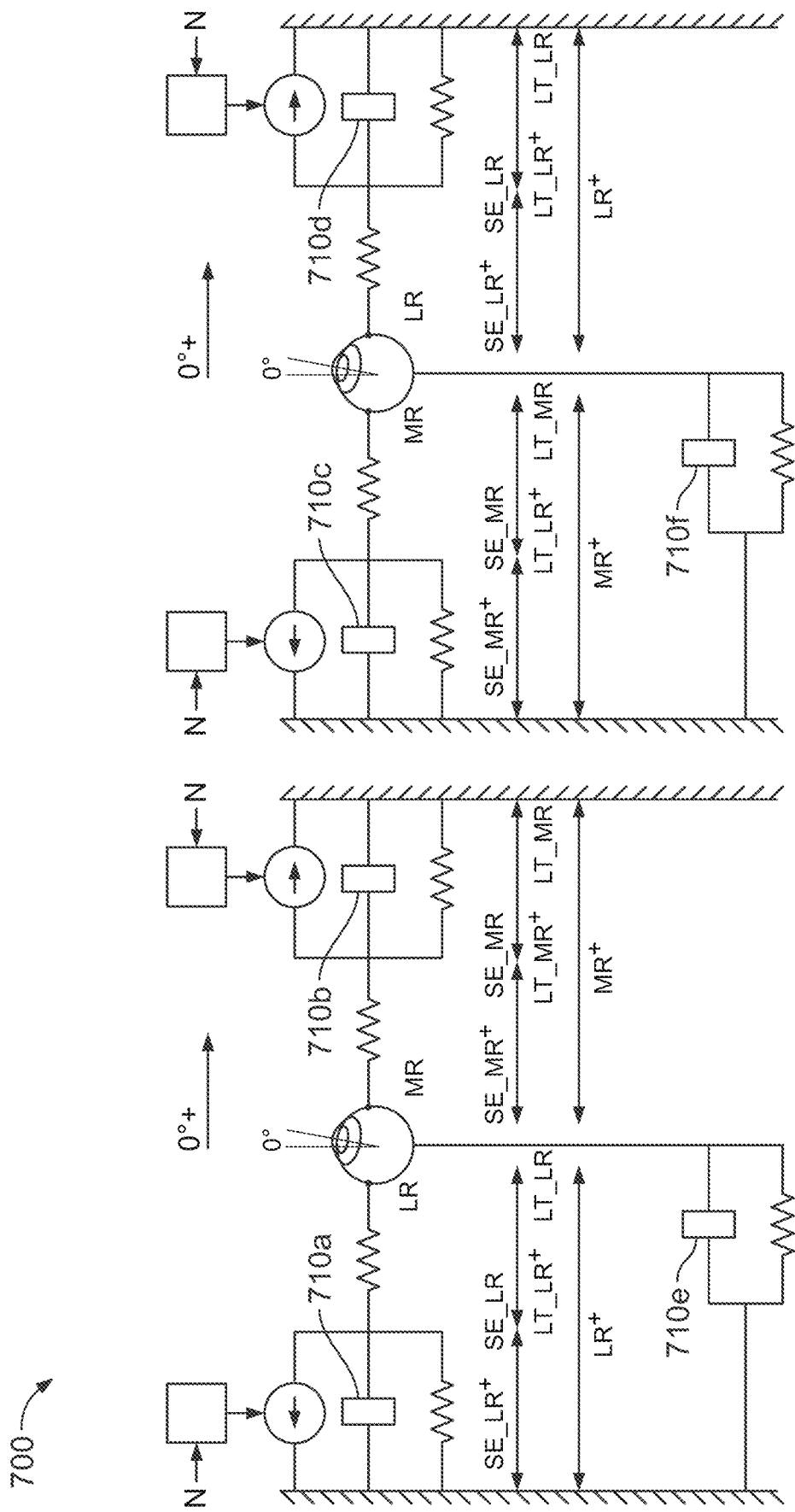
FIG. 7 illustrates another parameterized model of an eye in accordance with some implementations.

In some implementations, detecting that a gaze direction of the eye is approximately oriented towards the target area (e.g., a hot zone/spot) is based on tracking the eye using a parameterized oculomotor model of the eye. FIGS. 6-7 illustrate parameterized oculomotor eye models 600, 700, respectively. For example, camera images and light sensor data may be used to set the parameters (e.g., coefficients) of such a model and thus predict the eye characteristics represented thereby.

The eye rotates in its socket through the use of six muscles. The medial recti (MR) and lateral recti (LR) are mainly responsible for horizontal eye movements. The superior recti (SR) and inferior recti (IR) are mainly responsible for vertical eye movements. The superior oblique (SO) and inferior oblique (10) are mainly responsible for eye rotations around the eye's primary axis of sight and vertical eye movements.

Model 600 models the biomechanics of the lateral recti (LR) of the eye 125 by modeling rotations of the eye 125 in plane. The rotation $\theta$ is attached to a series elastic (SE) element 610 that is stimulated by a neuronal activation function 620. The neuronal activation function 620 models an impulse that gets transmitted to the eye 125. $\theta_{SE\_LR}$ 640 and $\theta_{LT\_LR}$ 650 represent the possible deformations of the lateral recti (LR) muscle as modeled by the series elastic and length tension elements (with respect to the ocular socket that is considered fixed). Model 700 accounts for the dual-muscle characteristic of the eye and permits the tracking of the eye about the horizontal axes. Additional similar models may be used to enable tracking of the eye about the vertical axes, for torsional movements of the eye and dialatory pupil movements as well. It additionally shows a viscous element 710a-f that is used for modeling the damped response of ocular muscles.

The neuronal activation function is used to simulate the pulse characteristics of control signals from the brain. These neuronal control signals are used to compute the dynamical behavior of the muscle groups. The oculomotor plant enables the modeling of passive elasticity, tensioning, length tensioning, series elasticity and force velocity responses of oculomotor muscles. This consequently allows the estimation of the time-displacement behavior of the eye based on prior and current measurements of the state of the eye.

In some implementations, eye rotations are tracked based on camera images and light sensor data and used to calculate the coefficients of a parameterized oculomotor model of the eye 125. The model may be used to provide a state space description of the eye. For example, a transformation matrix may be developed and used to make predictions. For example, given a particular state, a transformation matrix may be used to predict velocities and/actuations that would be expected according to the oculomotor model of the eye. Based on observed motion, future motion of the eye may be predicted. In some implementations, camera and/or light sensor data are used to determined coefficients of a model and the model is used to interpolate eye characteristics during an intermediate time between frames of camera images based on the light sensor data received during that time. For example, once the eye finishes blinking, the model may predict a natural fixation in a particular direction. The light sensors may detect a blink during an intermediate period, and the system may determine an expected eye movement based on the modeled eye behavior.

The eye may additionally or alternatively be tracked using a vergence or accommodation model specific to the eye. Such models may be based on a previously-tracked behavior of the eye. The model may learn and thus be used to predict what the eye 125 typically does when trying to inspect a scene. In some implementations, information from one eye is used to predict what the other eye is doing based on a model that accounts for correspondences between the behaviors of the user's two eyes.

In some implementations, camera and/or sensor data are used to as input to a machine learning model that is trained to output a gaze direction. The machine learning model may include models that use neural networks, decision trees, linear regression, support vector machines, and the like. A machine learning model may be trained based on training data, e.g., ground truth data, that identifies the eye characteristic for a given set of training inputs. For example, gaze direction may be manually labelled by a training user following a displayed item on a display and deriving the gaze direction corresponding to the displayed location of the item over time. A machine learning model may utilize image and light sensor data corresponding to multiple states of a system (e.g., each of the last 5 images and all light sensor data received during that time period) to predict an eye characteristic for the current state and/for one or more future states of the system.

Figure 8:
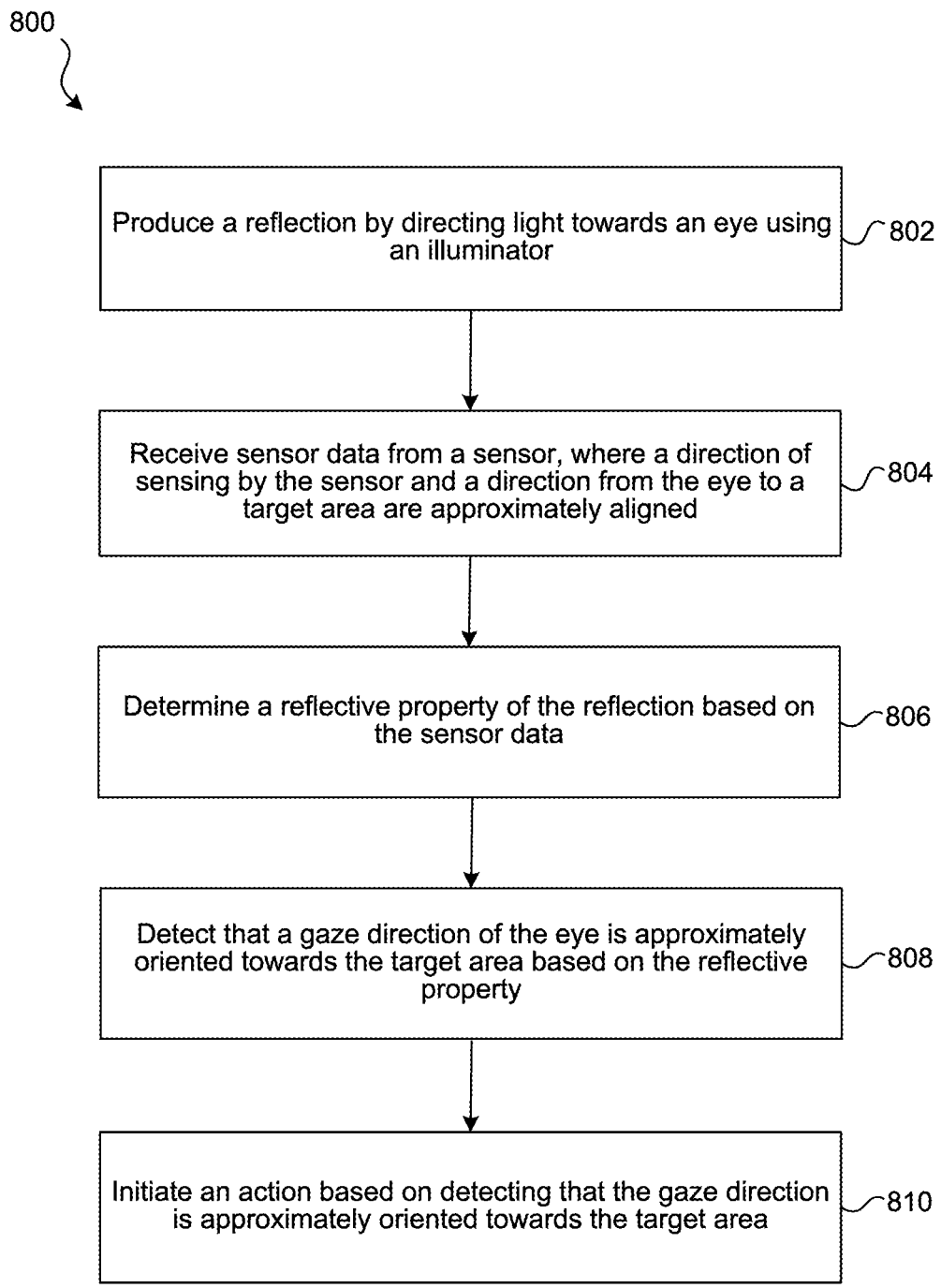
FIG. 8 is a flowchart representation of a method for initiating an action based on detecting that a gaze direction is approximately oriented towards a target area in accordance with some implementations.

FIG. 8 is a flowchart illustrating an exemplary method 800. In some implementations, a device (e.g., device 10 of FIG. 1) performs the techniques of method 800 for initiating an action based on detecting that a gaze direction is approximately oriented towards a target area in accordance with some implementations. In some implementations, the techniques of method 800 are performed on a mobile device, desktop, laptop, HMD, or server device. In some implementations, the method 800 is performed on processing logic, including hardware, firmware, software, or a combination thereof. In some implementations, the method 800 is performed on a processor executing code stored in a non-transitory computer-readable medium (e.g., a memory). In an exemplary implementation, the techniques of method 800 are performed at an electronic device (e.g., an HMD) having a processor.

In some implementations, the HMD includes a waveguide as at least a portion of the display. In some implementations, a waveguide, as used herein, may refer to an optical element that includes geometric, holographic, and/or diffractive optics. Additionally, a waveguide may include a waveguiding region that is designed to emit or collect light from one part of a device (e.g., device 210) to another part of the device.

At block 802, the method 800 producing a reflection by directing light towards an eye using an illuminator. The illuminator produces light that reflects off a retina of an eye. For example, as illustrated in FIG. 1, an eye-tracking system of device 10 uses a light source 32 that produces IR light and an image sensor (e.g., sensor 34 and/or sensor 36) to observe light scattered off of a surface of the retina of the eye 45 in order to acquire data of the reflections of the retina.

In some implementations, the light is IR light. In some implementations, the light source is a LED. Alternatively, another type of light source may be used that sufficiently provides a retinal-based image when the light from the light source is projected onto the eye.

At block 804, the method 800 receives sensor data from a sensor, where a direction of sensing by the sensor and a direction from the eye to a target area are approximately aligned. In some implementations, the direction may be the optical axis of the camera. For example, the sensor may be a low-power sensor, such as a photodiode.

In some implementations, a direction of the light produced by the illuminator may be aligned or the light may be diffuse (e.g., a camera flash). In some implementations, there may be two light sources such as in the superior temporal region (e.g., ST zone 231) and another in the superior nasal region (e.g., SN zone 233).

In some implementations, a device (e.g., device 210) receives an image of a portion of the retina from an image sensor, the image corresponding to a plurality of reflections of the light scattered from the retina of the eye. For example, a sensor (e.g., sensor 330) may be an IR image sensor/detector. The sensor may be a lower power sensor (e.g., low-power sensor 36), such as a photodiode. For example, as illustrated in FIGS. 3A and 3B, the eye-tracking system of example environment 300 uses low-power sensor 330 (e.g., a 1-2 pixel receiver, such as a photodiode) to observe light scattered off of a surface of the retina of the eye 45 in order to acquire the sensor data.

At block 806, the method 800 determines a reflective property of the reflection based on the sensor data. For example, the reflective property (e.g., a spectral property) may be indicative of an amount of reflection of the light from the fundus of the eye. The fundus is the back surface of the eye opposite the opening/pupil and may include the retina, macula, optic disc, fovea and blood vessels. In some implementations, an amount of the reflection is indicative of a level of alignment between the direction of sensing of the sensor and the gaze direction. In an exemplary implementation, when the amount of reflection is greater the more the eye is aligned with the approximate sensor direction and direction of the target area (e.g., target area 262), otherwise known as the "hot spot". In some implementations, the amount of reflection detected increases the more the fundus aligns with the sensor direction.

At block 808, the method 800 detects that a gaze direction of the eye is approximately oriented towards the target area (e.g., a hot zone/spot) based on the reflective property. For example, the greater the amount of reflection detected, the more aligned the gaze direction is towards the target area. In some implementations, the gaze direction may be considered approximately towards the target area if the reflective property is within a threshold indicating that the gaze direction is within threshold of a target direction (e.g., within than 5 degrees). In some implementations, the reflection may be used to generate a time-amplitude or frequency-time response to identify when the eye is aligned approximately (e.g., within an angular threshold) towards a hot corner.

In some implementations, detecting that the gaze direction of the eye is approximately oriented towards the target area includes determining that the reflective property is within an angular threshold (e.g., within 5 degrees), wherein the angular threshold indicates that the gaze direction is within a threshold of a target direction.

In some implementations, detecting that the gaze direction of the eye is approximately oriented towards the target area includes generating, based on the reflection, a time-amplitude response to identify that the gaze direction is aligned approximately towards the target area.

In some implementations, detecting that the gaze direction of the eye is approximately oriented towards the target area includes generating, based on the reflection, a frequency-time response to identify when the gaze direction is aligned approximately towards the target area.

In some implementations, detecting that the gaze direction of the eye is approximately oriented towards the target area is based on tracking the eye using a parameterized model of the eye. For example, as illustrated in FIGS. 6 and 7, models 600, and 700 may be utilized by using camera images and light sensor data to set the parameters (e.g., coefficients) of such a model and thus predict the eye characteristics represented thereby.

In some implementations, the target area is positioned at one zone of a plurality of zones on a display of the device. For example, the target area may be positioned at a corner of the display of the device. For example, as illustrated in FIG. 2B, the target area may be located in one of the corner zones, such as ST zone 231, SN zone 233, IT zone 236, or IN zone 238 of the device 210 (e.g., an HMD that includes a transparent substrate and a waveguide system for the display).

At block 810, the method 800 initiates an action based on detecting that the gaze direction is approximately oriented towards the target area. For example, a user may glance at a hot corner to trigger an action, e.g., initiate an XR experience that uses full eye tracking, provide a response to a notification, etc. as illustrated in the sequenced events for FIGS. 5A-5C, discussed herein.

In some implementations, the action provides a user response to a notification. For example, an application may ask a user a question, such as "Do you wish to proceed?" The action may then be for the user to glance at the target area that that has the word "Yes" displayed. For example, application icon 504 may be replaced with the word "yes" or "no" to confirm whether or not the user wanted the clock application 512 displayed.

In some implementations, the action may be initiated if the gaze satisfies a criterion. For example, if a user has a glance lasting more than a threshold amount of time at the hot spot, such as longer than 2 seconds, then an action may be initiated (e.g., start an application on the display, such as illustrated in FIGS. 5A-5C).

In some implementations, the action triggers an eye tracking algorithm based on sensor data received from a second sensor, where the first sensor is different than and uses lower power than the second sensor. For example, as illustrated in FIG. 1, the second sensor may include a high-power sensor 34 (e.g., a CMOS detector), and the first lower power sensor may include a low-power sensor 36, such as a photodiode, to obtain eye gaze characteristic data 44.

In some implementations, the method 800 further includes detecting gaze directions towards multiple target areas using multiple illuminators and multiple sensors corresponding to the multiple target areas, wherein the multiple illuminators produce light having different wavelengths, wherein the multiple sensors distinguish reflections of light produced by the multiple illuminators based on wavelength. For example, an application may include different hot spots that initiate different actions. For example, a glance towards the ST zone 231 (top left corner) may initiate a first application, a glance towards the SN zone 233 (top right corner) may initiate a second application, and a glance towards the IN zone 238 (bottom right corner) may initiate an exit all applications action (e.g., close out every open application).

In some implementations, the device is an HMD that includes a waveguide (e.g., waveguide 410 of FIGS. 4A and 4B). In some implementations, the waveguide approximately aligns the direction of sensing by the sensor, or the direction of the light produced by the illuminator with the direction from the eye to the target area.

In some implementations, the method 800 further includes determining an eye characteristic based on a determined location of user's accommodation depth. For example, the eye characteristic may include a gaze direction, eye orientation, or the like, for an eye-tracking system. For example, if the electronic device is an HMD (e.g., device 210), the eye-tracking system for the HMD can track gaze direction, eye orientation, etc. of a user.

Figure 9:
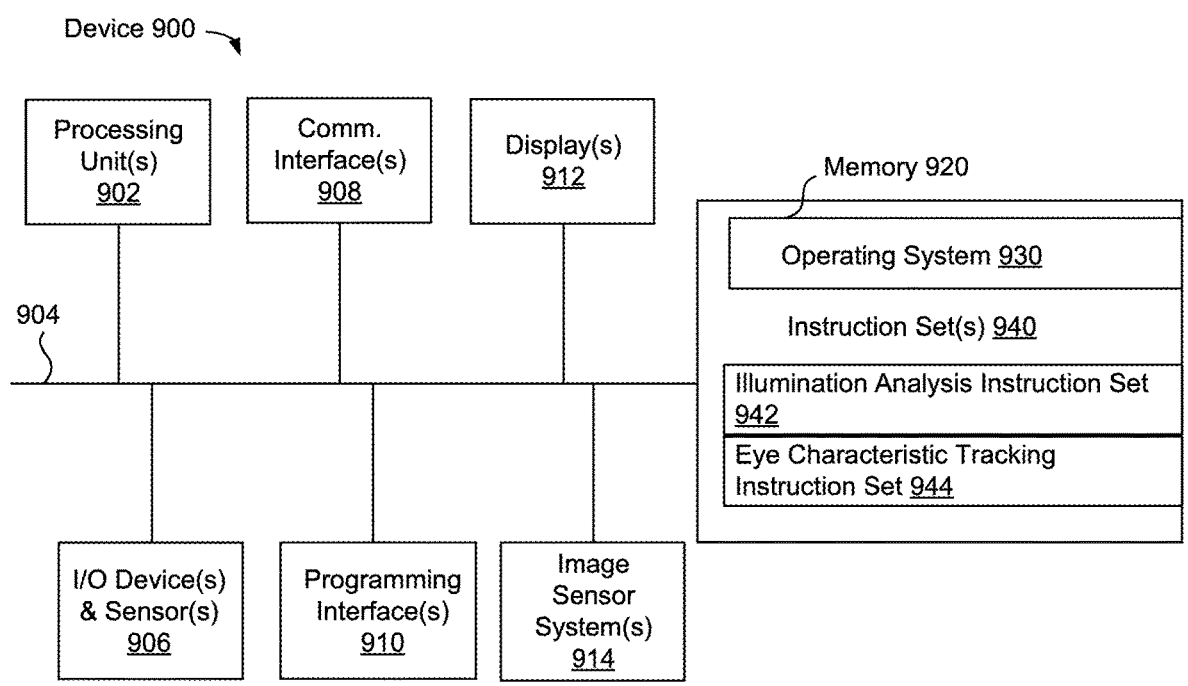
FIG. 9 is a block diagram illustrating device components of an exemplary device according to some implementations.

FIG. 9 is a block diagram of an example device 900. Device 900 illustrates an exemplary device configuration for device 10. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 910, one or more displays 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 912 are configured to present a view of a physical environment or a graphical environment to the user. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 912 correspond to diffractive, reflective, polarized, holographic, etc. waveguide displays. In one example, the device 10 includes a single display. In another example, the device 10 includes a display for each eye of the user.

In some implementations, the one or more image sensor systems 914 are configured to obtain image data that corresponds to at least a portion of the physical environment. For example, the one or more image sensor systems 914 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 includes a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of electrical charge. In some implementations, the instruction set(s) 940 are software that is executable by the one or more processing units 902 to carry out one or more of the techniques described herein.

The instruction set(s) 940 include an illumination analysis instruction set 942 and an eye characteristic tracking instruction set 944. The instruction set(s) 940 may be embodied a single software executable or multiple software executables.

In some implementations, the illumination analysis instruction set 942 is executable by the processing unit(s) 902 to produce a reflection by directing light towards an eye using an illuminator (e.g., the light may be IR), receive sensor data from a sensor (e.g., the sensor may be a photodiode) and determine a reflective property (e.g., a spectral property) of the reflection based on the sensor data. To these ends, in various implementations, the instruction includes instructions and/or logic therefor, and heuristics and metadata therefor.

In some implementations, the eye characteristic tracking instruction set 944 is executable by the processing unit(s) 902 to track a user's eye gaze characteristics such as detecting a gaze direction of the eye is approximately oriented towards the target area (e.g., a hot zone/spot) based on a reflective property using one or more of the techniques discussed herein or as otherwise may be appropriate. To these ends, in various implementations, the instruction includes instructions and/or logic therefor, and heuristics and metadata therefor.

Although the instruction set(s) 940 are shown as residing on a single device, it should be understood that in other implementations, any combination of the elements may be located in separate computing devices. Moreover, FIG. 9 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 10:
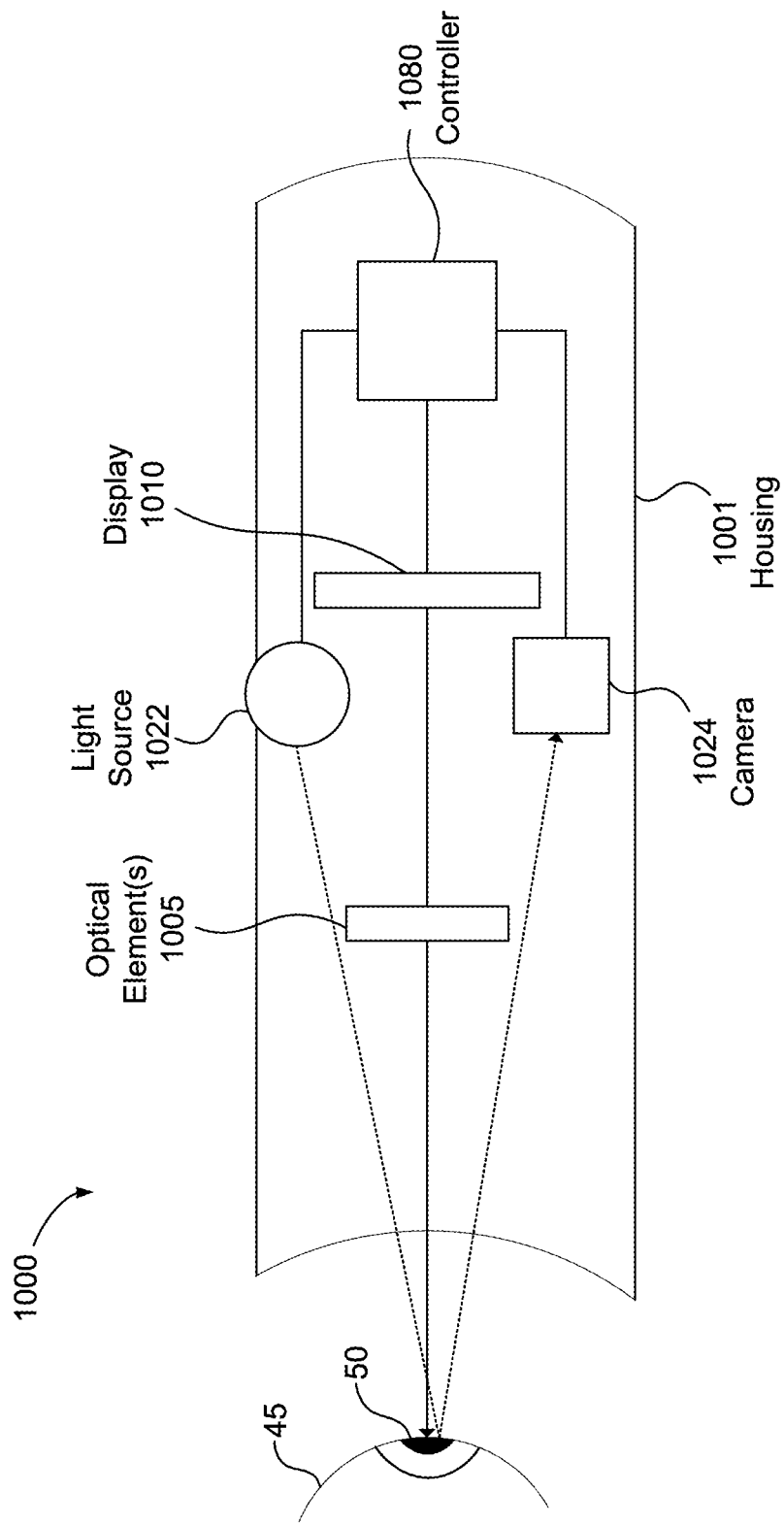
FIG. 10 is a block diagram of an example head-mounted device (HMD) in accordance with some implementations.

FIG. 10 illustrates a block diagram of an exemplary head-mounted device 1000 in accordance with some implementations. The head-mounted device 1000 includes a housing 1001 (or enclosure) that houses various components of the head-mounted device 1000. The housing 1001 includes (or is coupled to) an eye pad (not shown) disposed at a proximal (to the user 25) end of the housing 1001. In various implementations, the eye pad is a plastic or rubber piece that comfortably and snugly keeps the head-mounted device 1000 in the proper position on the face of the user 25 (e.g., surrounding the eye of the user 25).

The housing 1001 houses a display 1010 that displays an image, emitting light towards or onto the eye of a user 25. In various implementations, the display 1010 emits the light through an eyepiece having one or more optical elements 1005 that refracts the light emitted by the display 1010, making the display appear to the user 25 to be at a virtual distance farther than the actual distance from the eye to the display 1010. For example, optical element(s) 1005 may include one or more lenses, a waveguide, other diffraction optical elements (DOE), and the like. For the user 25 to be able to focus on the display 1010, in various implementations, the virtual distance is at least greater than a minimum focal distance of the eye (e.g., 6 cm). Further, in order to provide a better user experience, in various implementations, the virtual distance is greater than 1 meter.

The housing 1001 also houses a tracking system including one or more light sources 1022, camera 1024, and a controller 1080. The one or more light sources 1022 emit light onto the eye of the user 25 that reflects as a light pattern (e.g., a circle of glints) that can be detected by the camera 1024. Based on the light pattern, the controller 1080 can determine an eye tracking characteristic of the user 25. For example, the controller 1080 can determine a gaze direction and/or a blinking state (eyes open or eyes closed) of the user 25. As another example, the controller 1080 can determine a pupil center, a pupil size, or a point of regard. Thus, in various implementations, the light is emitted by the one or more light sources 1022, reflects off the eye of the user 25, and is detected by the camera 1024. In various implementations, the light from the eye of the user 25 is reflected off a hot mirror or passed through an eyepiece before reaching the camera 1024.

The display 1010 emits light in a first wavelength range and the one or more light sources 1022 emit light in a second wavelength range. Similarly, the camera 1024 detects light in the second wavelength range. In various implementations, the first wavelength range is a visible wavelength range (e.g., a wavelength range within the visible spectrum of approximately 400-800 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 1010 by looking at it), provide foveated rendering (e.g., present a higher resolution in an area of the display 1010 the user 25 is looking at and a lower resolution elsewhere on the display 1010), or correct distortions (e.g., for images to be provided on the display 1010).

In various implementations, the one or more light sources 1022 emit light towards the eye of the user 25 which reflects in the form of a plurality of glints.

In various implementations, the camera 1024 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 1024 is an event camera including a plurality of light sensors (e.g., a matrix of light sensors) at a plurality of respective locations that, in response to a particular light sensor detecting a change in intensity of light, generates an event message indicating a particular location of the particular light sensor.

Returning to FIG. 1, a physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at an electronic device having a processor, a lens through which a user views a physical environment, and a display:
producing a reflection by directing light towards an eye using an illuminator;
receiving sensor data from a sensor, wherein a detected direction of sensing by the sensor and a detected gaze direction from the eye to a target area on the lens are approximately aligned, wherein the target area comprises a predefined region on the lens and is associated with a user interface action;
determining a reflective property of the reflection based on the sensor data, wherein the reflective property is indicative of an amount of reflection of the light from a fundus of the eye, wherein the amount of reflection comprises a measured intensity of light reflected from the fundus of the eye; and
detecting that the gaze direction of the eye is approximately aligned with the target area on the lens based on the amount of the reflection of the light from the fundus of the eye indicating a level of alignment between the detected direction of sensing of the sensor and the detected gaze direction of the eye, wherein the level of alignment is detected when the measured intensity exceeds a predetermined threshold.

2. The method of claim 1 further comprising initiating the user interface action based on detecting that the gaze direction is approximately aligned with the target area.

3. The method of claim 1, wherein detecting that the gaze direction of the eye is approximately aligned with the target area comprises determining that the amount of reflection that includes the measured intensity of light reflected from the fundus of the eye is within an angular threshold, wherein the angular threshold indicates that the gaze direction is within a threshold of the target area.

4. The method of claim 1, wherein detecting that the gaze direction of the eye is approximately aligned with the target area comprises generating, based on the reflection, at least one of a time-amplitude response and a frequency-time response to identify that the gaze direction is aligned approximately towards the target area.

5. The method of claim 1, wherein detecting that the gaze direction of the eye is approximately aligned with the target area is based on using a parameterized model of the eye.

6. The method of claim 1, wherein the sensor is a first sensor, and the user interface action triggers an eye tracking algorithm based on sensor data received from a second sensor, wherein the first sensor is different than and uses lower power than the second sensor.

7. The method of claim 1, wherein the user interface action is initiated based on whether the gaze direction satisfies a criterion.

8. The method of claim 1, wherein the user interface action provides a user response to a notification.

9. The method of claim 1, wherein the user interface action comprises initiating an extended reality (XR) experience.

10. The method of claim 1, wherein the target area is positioned at one zone of a plurality of zones on the display of the electronic device.

11. The method of claim 1, wherein the light is infrared (IR) light.

12. The method of claim 1, further comprising detecting gaze directions towards multiple target areas using multiple illuminators and multiple sensors corresponding to the multiple target areas, wherein the multiple illuminators produce light having different wavelengths, wherein the multiple sensors distinguish reflections of light produced by the multiple illuminators based on wavelength.

13. The method of claim 1, wherein the electronic device comprises a head mounted device (HMD) that comprises a waveguide, wherein the waveguide approximately aligns the direction of sensing by the sensor, or the direction of the light produced by the illuminator with the direction from the eye to the target area.

14. A device comprising:
a lens through which a user views a physical environment;
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
producing a reflection by directing light towards an eye using an illuminator;
receiving sensor data from a sensor, wherein a detected direction of sensing by the sensor and a detected gaze direction from the eye to a target area on the lens are approximately aligned, wherein the target area comprises a predefined region on the lens and is associated with a user interface action;
determining a reflective property of the reflection based on the sensor data, wherein the reflective property is indicative of an amount of reflection of the light from a fundus of the eye, wherein the amount of reflection comprises a measured intensity of light reflected from the fundus of the eye; and
detecting that the gaze direction of the eye is approximately aligned with the target area on the lens based on the amount of the reflection of the light from the fundus of the eye indicating a level of alignment between the detected direction of sensing of the sensor and the detected gaze direction of the eye, wherein the level of alignment is detected when the measured intensity exceeds a predetermined threshold.

15. A non-transitory computer-readable storage medium, storing program instructions executable on a device that includes a lens through which a user views a physical environment, wherein the device performs operations comprising:
producing a reflection by directing light towards an eye using an illuminator;
receiving sensor data from a sensor, wherein a detected direction of sensing by the sensor and a detected gaze direction from the eye to a target area on the lens are approximately aligned, wherein the target area comprises a predefined region on the lens and is associated with a user interface action;
determining a reflective property of the reflection based on the sensor data, wherein the reflective property is indicative of an amount of reflection of the light from a fundus of the eye, wherein the amount of reflection comprises a measured intensity of light reflected from the fundus of the eye; and
detecting that the gaze direction of the eye is approximately aligned with the target area on the lens based on the amount of the reflection of the light from the fundus of the eye indicating a level of alignment between the detected direction of sensing of the sensor and the detected gaze direction of the eye, wherein the level of alignment is detected when the measured intensity exceeds a predetermined threshold.

16. The method of claim 1, wherein the illuminator is embedded within the lens proximate the target area.

17. The method of claim 1, wherein the illuminator directs light through a waveguide to illuminate the eye from an area proximate the target area.

18. The method of claim 1, wherein the sensor is embedded within the lens proximate the target area.

19. The method of claim 1, wherein the sensor receives light via a waveguide in the lens, wherein the waveguide receives the light from an area proximate the target area.

20. The method of claim 1, wherein the illuminator and the sensor are embedded within the lens proximate the target area.

21. The method of claim 1, wherein the user interface action associated with the target area comprises initiating an extended reality (XR) experience, wherein the XR experience is launched in response to detecting that the gaze direction is aligned with the target area for at least a threshold duration.

22. The method of claim 1, wherein the user interface action associated with the target area comprises providing a confirmation input for a user selection, wherein the confirmation input is registered when the gaze direction is maintained on the target area for a predetermined period.

23. The method of claim 1, wherein the user interface action associated with the target area comprises dismissing a notification or application, wherein the dismissal is triggered by detecting a gaze direction aligned with a designated target area outside of a display field of view (FOV).

24. The method of claim 1, wherein the sensor comprises a photodiode configured to detect the intensity of light reflected from the fundus of the eye, and the photodiode operates in a low-power mode when a high-power eye tracking sensor is inactive.

\* \* \* \* \*